United States Patent [19]

Harasaki

[11] 4,408,794

[45] Oct. 11, 1983

[54] SUPPORT COLUMN FOR AUTOMOBILE WHEEL SUSPENSION ASSEMBLY

[75] Inventor: Hayathugu Harasaki, Hiroshima, Japan

[73] Assignee: Toyo Kogyo Co., Ltd., Hiroshima, Japan

[21] Appl. No.: 318,276

[22] Filed: Nov. 4, 1981

[30] Foreign Application Priority Data

Nov. 11, 1980 [JP]  Japan ............................... 55-159196

[51] Int. Cl.³ ............................................. B62D 25/08
[52] U.S. Cl. ..................................... 296/198; 296/195
[58] Field of Search ....................... 296/198, 194, 195; 280/668, 710

[56] References Cited

U.S. PATENT DOCUMENTS

| | | | |
|---|---|---|---|
| 3,596,978 | 8/1971 | Wessells | 296/194 |
| 4,042,259 | 8/1977 | Fiedler et al. | 280/688 |
| 4,213,631 | 7/1980 | Wilkerson | 280/688 |

FOREIGN PATENT DOCUMENTS 51-73408  6/1976  Japan.
777551  6/1957  United Kingdom ................ 296/198

*Primary Examiner*—Robert R. Song
*Attorney, Agent, or Firm*—Wenderoth, Lind & Ponack

[57] ABSTRACT

A support column provided in an automobile body structure for accommodating a rear wheel suspension assembly comprises a column structure rigidly mounted on an apron forming a part of the body structure and defining a wheel housing. This column structure is also rigidly connected to an inner panel of the body structure and project generally upwardly from the apron for accommodating the wheel suspension assembly having one end connected to and supported by a support plate. This support plate has a bracket portion to which one end of the suspension assembly is connected and a brace portion extending downwardly towards the inner panel.

12 Claims, 6 Drawing Figures

SUPPORT COLUMN FOR AUTOMOBILE WHEEL SUSPENSION ASSEMBLY

BACKGROUND OF THE INVENTION

The present invention generally relates to an automobile body structure and, more particularly, to a support column provided in the automobile body structure for accommodating a rear wheel suspension assembly.

A modern automobile now in use is known as generally having a wheel suspension assembly for each wheel to provide a comfortable ride, which suspension assembly is disposed either between the wheel axle and a chassis or between the wheel axle and the body structure. The present invention pertains particularly to a rear wheel suspension assembly for each left-hand or right-hand rear wheel which is disposed between the rear wheel axle and the body structure.

The rear wheel suspension assembly is available in numerous types and, so far as the present invention is involved, typically includes a telescopically displaceable shock absorber and a coil spring around the shock absorber. In the case where the rear wheel suspension assembly is disposed between the wheel axle and the body structure, the prior art technique is such as to employ a support bracket that projects into the interior of the body structure generally upwardly from the corresponding wheel housing forming a part of the body structure, so that respective end portions of the shock absorber and the coil spring remote from the wheel axle can extend into the interior hollow of the support bracket and be connected thereto. An example of this is disclosed in the Japanese Laid-open Utility Model Publication No. 51-73408 laid open to public inspection on June 9, 1976.

According to this prior art reference, the support bracket is of generally U-shaped cross section and comprises an elongated spine plate substantially curved to follow a cross-sectional representation of the wheel housing as viewed in a direction generally perpendicular to the wheel axle and a pair of side walls projecting perpendicularly from the spine plate. While respective portions of the spine plate and the side walls are spot-welded to an apron forming a part of the body structure end defining the wheel housing, a flange at one and of the bracket positioned substantially immediately above the rear wheel is spot-welded to an inner panel forming a part of the body structure together with the apron.

In this known support bracket, since a generally rod-shaped, telescopically displaceable shock absorber is disposed between the wheel axle and the support bracket so as to extend inwardly of the body structure at an angle relative to the longitudinal axis of the wheel axle with its opposite ends operatively coupled to the wheel axle and the spine plate of the support bracket, excessive impacts acting on the suspension assembly as the wheel encounters irregularities in the road tend to be transmitted to the support bracket in a direction diagonally upwardly towards the interior of the body structure and, in the worst case, the support bracket may separate from the inner panel to which it has been spot-welded. In other words, the prior art support bracket lacks a sufficient rigidity necessary to support the suspension assembly against excessive impacts or shocks.

SUMMARY OF THE INVENTION

The present invention has been developed with a view of substantially eliminating the disadvantages and inconveniences inherent in the prior art support bracket and has for its essential object to provide an improved support column having a sufficient rigidity to support the rear wheel suspension assembly.

Another important object of the present invention is to provide an improved support column so designed as to provide a guide for facilitating the insertion and positioning of the wheel suspension assembly into the support column during the installation of the suspension assembly.

A further object of the present invention is to provide an improved support column which can be readily fabricated and is easy to install even in any existing automobile body structure with no unreasonable alteration of the specification of the wheel housing structure being required, as compared with the prior art support bracket discussed hereinbefore.

BRIEF DESCRIPTION OF THE DRAWINGS

These and other objects and features of the present invention will become better understood from the following description taken in conjunction with a preferred embodiment thereof with reference to the accompanying drawings, in which.

DETAILED DESCRIPTION OF THE INVENTION

Figure 1:
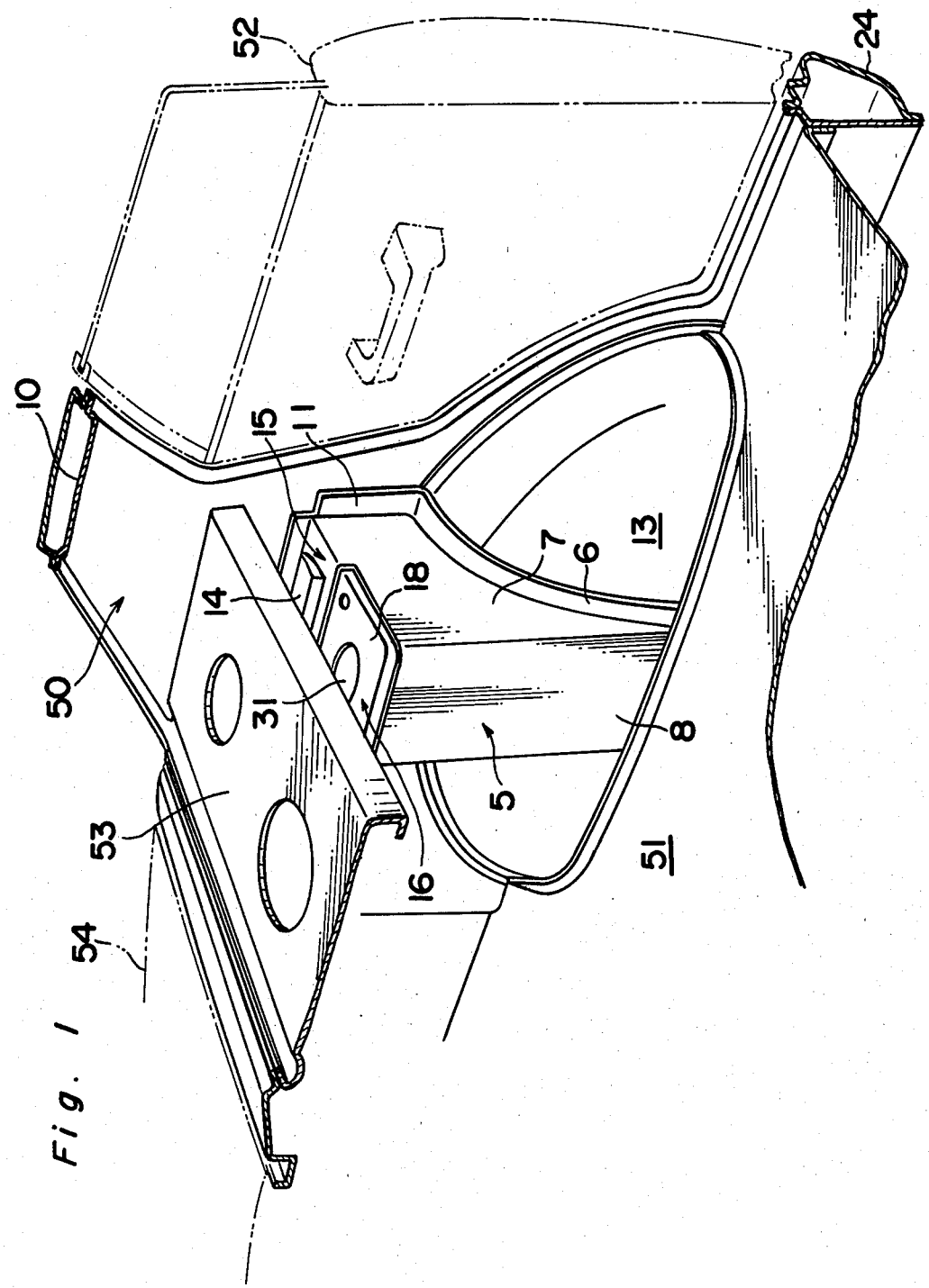
FIG. 1 is a perspective view, with a portion broken away, of a left-hand rear portion of an automobile body structure, showing a support column according to the present invention.

Referring first to FIG. 1, there is shown a left-hand rear portion of an automobile body structure. Exposed to the sight with a rear seat assembly removed is a rear side pillar assembly 50 having one end continued to the roof (not shown) and the other end continued to a floor panel 51, a left-hand rear door assembly 52 (shown by the phantom line), a rear shelf panel 53 extending between one rear side pillar assembly 50 to the opposite rear side pillar assembly (not shown), and a hingedly supported trunk lid 54 (partially shown by the phantom line). A support column for accommodating a rear wheel suspension assembly according to the present invention is shown generally by 5 and is rigidly positioned on an apron 13 defining a wheel housing H on one side of the apron 13 opposite to the interior of the body structure and generally below the rear side pillar assembly 50 as best shown in FIG. 3.

Referring now to FIGS. 1 to 5, the support column 5 projects upwardly from the apron 13 into the interior of the automobile body structure and terminates generally below the rear shelf panel 53. This support column 5 comprises a column structure including a pair of generally shoe-shaped, opposite side walls 7, each having a laterally extending flange 6 so curved as to follow the contour of the surface of the apron 13 opposite to the wheel housing H, a major upright wall 8 having its opposite side edges integral with the respective side walls 7 and lying in a plane perpendicular to any one of the side walls 7, and a pair of opposite flaps 9 integral with the respective side walls 7, which flaps 9 are perpendicularly folded at b with their free edge portions 9a and 9b rigidly connected, or otherwise spot-welded, together in overlapping relation to each other to provide a bridge plate 15 extending between the side walls 7 at a position opposite to the flanges 6 and spaced a distance from an upper end of the major upright wall 8 remote from the apron 13, leaving a generally rectangular opening on one side of such bridge plate 15 adjacent the major upright wall 8.

Figure 3:
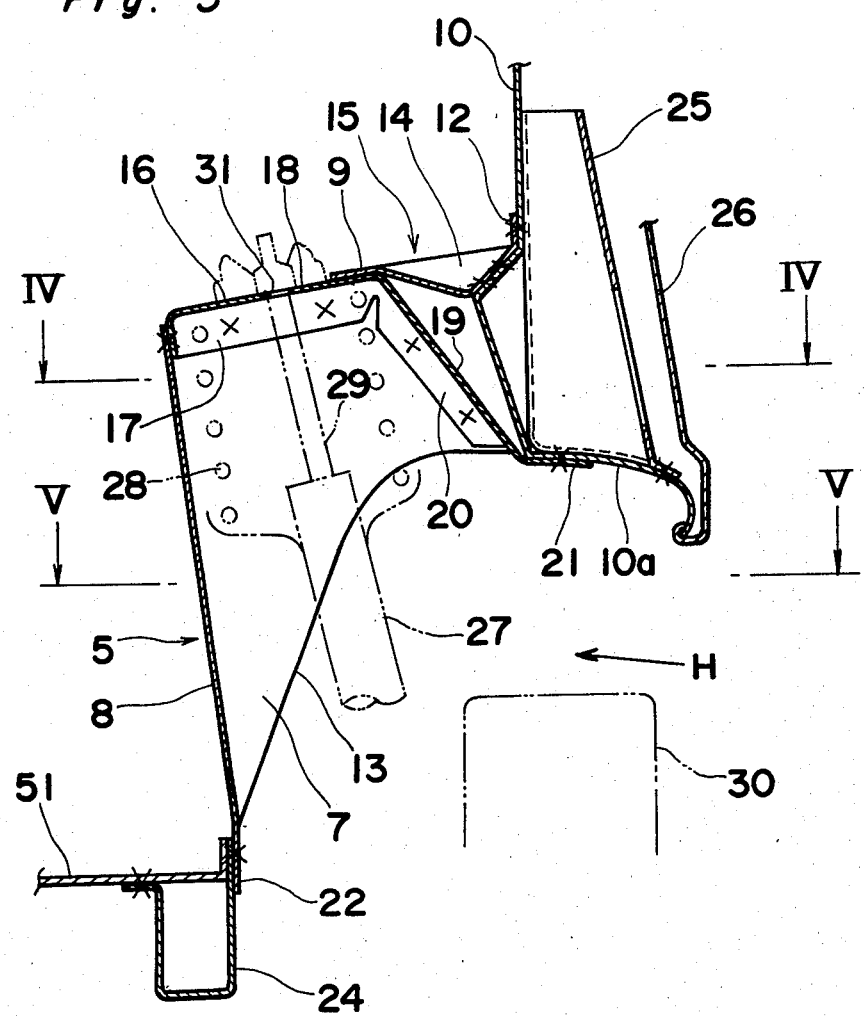
FIG. 3 is a longitudinal sectional view of the support column shown in FIG. 2.
Figure 4:
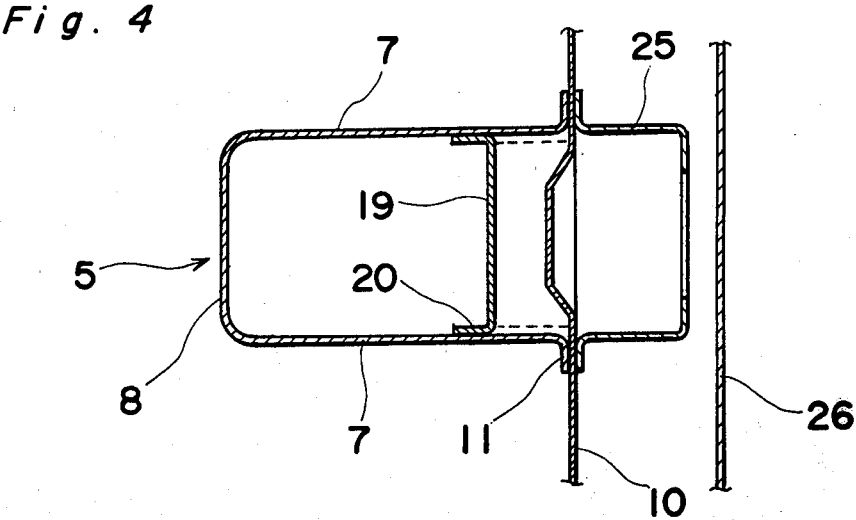
FIGS. 4 and 5 are cross-sectional views taken along the lines IV—IV and V—V, respectively, shown in FIG. 3.

As best shown in FIGS. 1 and 3, the support column 5 of the construction described above is mounted on the apron 13 with the flanges 6 spot-welded to said apron 13. Not only are the flanges 6 integral with the respective side walls 7 spot-welded to the apron 13, but respective flanges 11 integral with the side walls 7 and protruding laterally outwardly therefrom at a position opposite to the major upright wall 8, and a flange 12 integral with the bridge plate 15 and protruding upwardly therefrom are also spot-welded to an inner panel 10 forming a part of the side pillar assembly 50. A flange 22 integral with a lower end of the major upright wall 8 is spot-welded to an upright portion of a rear framework 24 together with one side edge portion of the rear floor panel 51 in sandwiched fashion.

Figure 5:
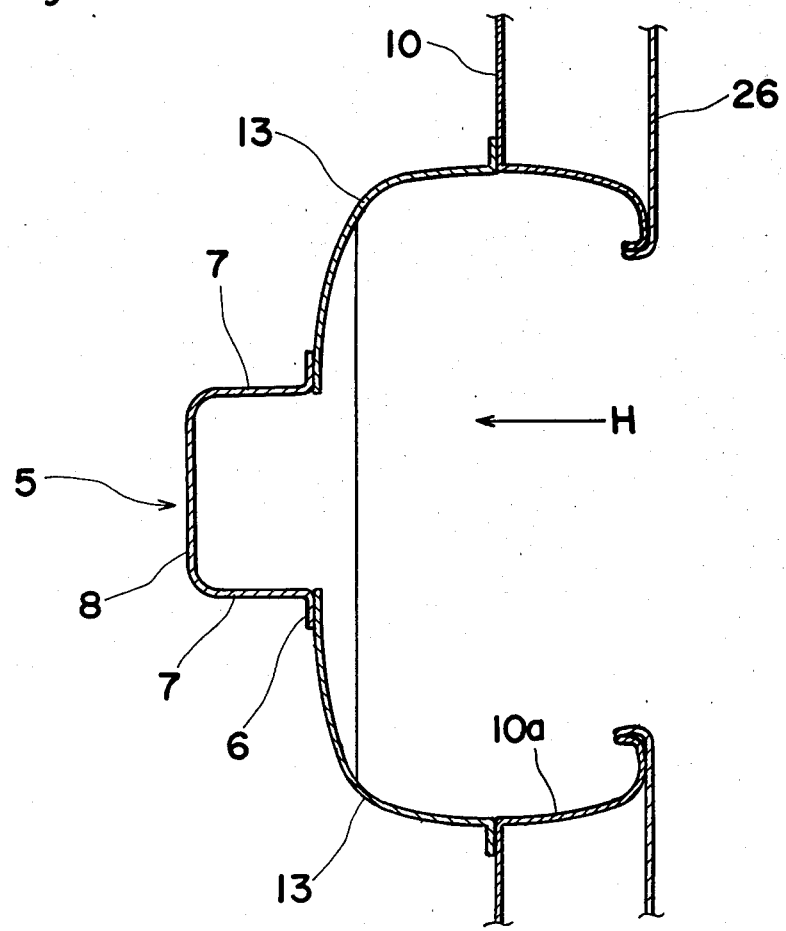

For the purpose as will become clear from the subsequent description, a lower lip region 10a of the inner panel 10 adjacent a left-hand, rear wheel shown by the phantom line 30 in FIG. 3, is bent, as best shown in FIGS. 3 and 5, to extend laterally outwardly of the body structure generally in parallel to the longitudinal axis of the wheel axle (not shown) on which the wheel 30 is mounted in any known manner, which lower lip region 10a defines the wheel housing H in cooperation with the apron 13. The lower lip region 10a surrounding the wheel 30 halfway is reinforced by a reinforcement 25 and is in turn covered by a left-hand rear fender 26 spaced a distance from the major body of the inner panel 10 with the reinforcement 25 positioned therebetween. The rear fender 26 may be a part of an outer panel of the body structure.

Figure 2:
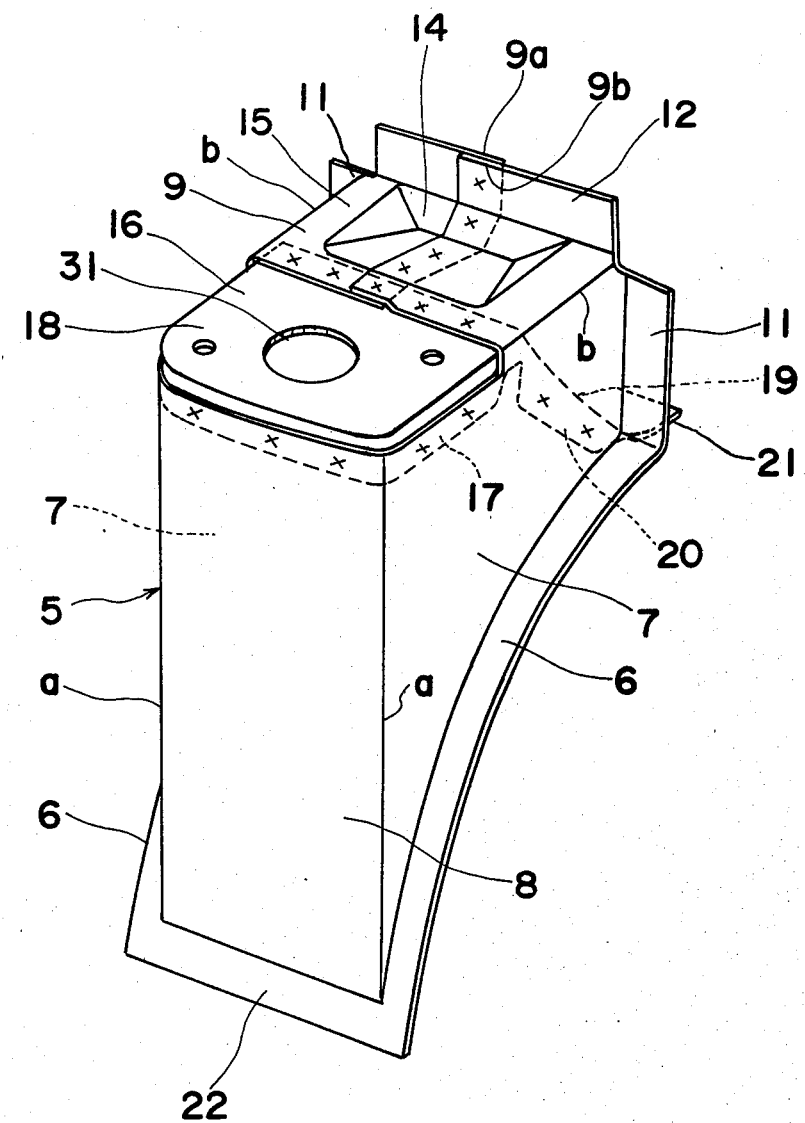
FIG. 2 is a perspective view, on a somewhat enlarged scale, of the support column showing the details thereof.

It is to be noted that the column structure composed of the side walls 7, the major upright wall 8 and the flaps 9 with their respective flanges 6, 11, 22 and 12 is preferably of one-piece construction and can be fabricated from a patterned metal sheet by the use of any known bending and press works. Specifically, by bending the patterned metal sheet along the bending lines shown by a in FIG. 2 to allow the side walls 7 to protrude in the same direction substantially perpendicular to the major upright wall 7 and then along the bending lines b to allow the flaps 9 to be folded together with the free edge portions 9a and 9b overlapped one above the other, then by effecting a spot-welding to the overlapping free edge portions 9a and 9b of the respective flaps 9, and finally by using a press work to form the flanges 6, 11, 22 and 12, the column structure of the construction and shape as best shown in FIG. 2 can be obtained.

It is also to be noted that the bridge plate 15 composed of the connected flaps 9 has a generally rectangular recess 14 depressed inwardly of the column structure for the purpose of reinforcing such bridge plate 15.

The support column 5 also comprises a generally rectangular support plate 16 of one-piece construction having a bracket portion 18 and a brace portion 19 integral with the bracket portion 18, but bent a certain angle relative thereto. The support plate 16 is mounted on the column structure in such a manner that the bracket portion 18 is held in position to close the rectangular opening laterally of the bridge plate 15 with its peripheral flange 17 spot-welded to the walls 7 and 8 whereas the brace portion 19 extends within the interior of the column structure so as to diverge away from the major upright wall 8 with its side flanges 20 spot-welded to the side walls 7 and with its end flange 21 spot-welded from below to the peripheral lip region 10a of the inner panel 10 above the wheel 30. For this purpose, the apron 13 is to be understood as having a cutout opening defined therein not only for allowing a wheel suspension assembly, including a shock absorber 27 and a coil spring 28 externally of the shock absorber 27, to pass therethrough, but also for allowing the end flange 21 of the brace portion 19 of the support plate 16 to reach the peripheral lip region 10a of the inner panel 10.

While the support column according to the present invention is constructed in the manner as hereinabove described, the suspension assembly is coupled to and supported by the support column in the following manner. As best shown in FIG. 3, the shock absorber 27 mounted on the wheel axle in any known manner has a piston rod 29 having its free end engaged in a bearing hole 31 in the bracket portion 18 and rigidly coupled to said bracket portion 18. The coil spring 28 externally of the shock absorber 27 has one end coupled to a cylinder of the shock absorber 27 and the other end held in contact with the bracket portion 18 from below.

Figure 6:
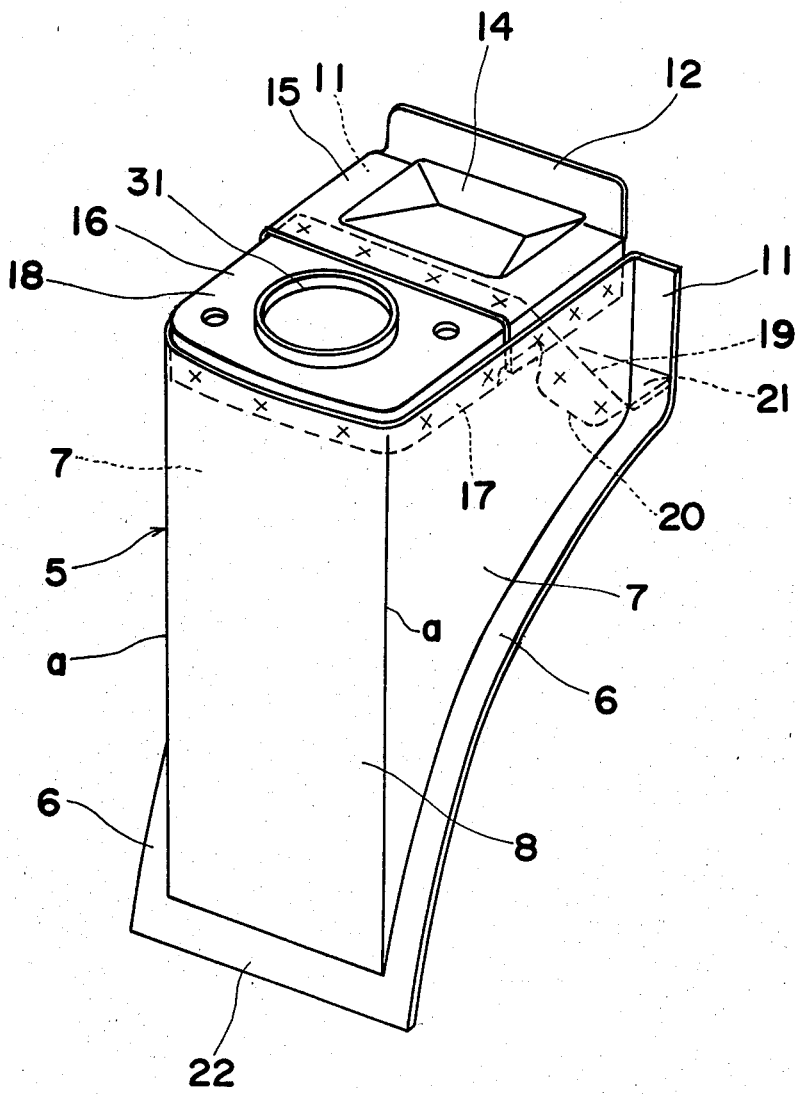
FIG. 6 is a view similar to FIG. 2, showing a modified form of the support column according to the present invention.

In the foregoing embodiment, it has been described that the flaps 9 forming the bridge plate 15 are integral with the side walls 7 which are in turn integral with the major upright wall 8. However, the bridge plate 15 may be made of a plate member separate from the side walls 7 such as shown in FIG. 6. In this modified form of FIG. 6, the bridge plate 15 has its opposite side edges formed integrally with respective flanges through which the bridge plate 15 is spot-welded to the side walls 7.

In any event, in the construction as hereinbefore fully described, the connection of the suspension assembly to the support column can readily be performed with no difficulty because the inclined brace portion 19 of the support plate 16 serves as a guide for guiding the free end of the piston rod 29 and the upper end of the coil spring 28 towards the bracket portion 18 with the free end of the rod 29 passed through the bearing aperture 31 even though any misalignment have occurred.

In addition, since the design is such that the impacts or shocks tending to be transmitted in the direction towards the interior of the automobile body structure while the automobile is traveling on the road can be distributed to the flanges 22, 6, 11, 12 and 21, and in view of the fact that each spot-welded connection exhibits a strength in a shearing direction, the support column as a whole has sufficient strength with no substantial possibility of some or all of the spot-welded flanges being separated from the member to which they have been connected. Specifically, the brace portion 19 of the support plate 16 is effective to define a generally triangularly cross-sectioned closed space in cooperation with the bridge plate 15 and the inner panel 10, thereby reinforcing the support column as a whole.

Although the present invention has fully been described in connection with the preferred embodiment thereof with reference to the accompanying drawings, it is to be noted that various changes and modifications are apparent to those skilled in the art. By way of example, as can readily be understood by those skilled in the art, the support column and the suspension assembly associated therewith are provided for each left-hand or right-hand rear wheel.

Accordingly, such changes and modifications are to be understood as included within the scope of the present invention unless they depart therefrom.

I claim:

1. A support column for an automobile body structure for accommodating a wheel suspension assembly for a rear wheel, the automobile body structure having a wheel housing generally encircling halfway the perimeter of the rear wheel, the body structure including an inner panel extending above the wheel housing, said support column comprising:
   a column structure for being rigidly mounted on the wheel housing and projecting generally upwardly therefrom in a direction away from the wheel, said column structure including a major upright wall and a pair of opposite side walls protruding from respective opposite side edges of said major upright wall so as to terminate in rigid and non-separable contact with a portion of the inner panel above the wheel housing;
   a plate means for connecting the column structure to the inner panel, said plate means connecting said side walls together in spaced relation at a position adjacent the inner panel and on one side of said side walls opposite to the wheel housing; and
   a support plate means having a bracket portion rigidly mounted on said column structure for connection with the suspension assembly and a brace portion having an end for rigid contact with the inner panel, extending downwardly from said bracket portion so as to diverge away from said major upright wall and terminating at said end.

2. A body structure for an automobile having a floor panel, for accommodating a wheel suspension system for a rear wheel, comprising:
   an inner panel having a lower portion and an upper major portion above said lower portion for extending upwardly of the rear wheel;
   an apron for rigid connection to the floor panel, rigidly connected to said lower portion of said inner panel; said apron and said lower portion of said inner panel forming a wheel housing for generally encircling halfway the perimeter of the rear wheel;
   a column structure rigidly mounted on said wheel housing and projecting generally upwardly therefrom in a direction away from the wheel, said column structure including a major upright wall and a pair of opposite side walls protruding form respective opposite side edges of said major upright wall and terminating in rigid and non-separable contact with said major portion of said inner panel above said wheel housing;
   each of said side walls having a flange projecting laterally outward therefrom and positioned on a side of the respective side wall facing away from the other side wall, said column structure being mounted on said wheel housing with said flanges of the respective side walls rigidly secured to said apron;
   a plate means connecting said side walls together in spaced relation at a position adjacent said inner panel and on one side of said side walls opposite to said wheel housing, said plate means also connecting the column structure to said inner panel; and
   a support plate means having a bracket portion rigidly mounted on said column structure for connection with the suspension assembly and a brace portion extending downwardly from said bracket portion so as to diverge away from said major upright wall and terminating in rigid contact with a portion of said inner panel.

3. A body structure as claimed in claim 2, wherein said lower portion of the inner panel extends laterally outwardly of the body structure and wherein said brace portion has a free end opposite to said bracket portion, said free end extending downwardly through said apron and rigidly secured to said lower portion of said inner panel from below.

4. A body structure as claimed in claim 2 or 3, wherein one end of said major upright wall adjacent the wheel has a flange formed integrally therewith for being rigidly secured to the floor panel.

5. A body structure as claimed in claim 4, wherein said plate means comprises a pair of flap members having respective free edge portions, formed integrally with respective ones of said side walls, said respective free edge portions of said flap members being rigidly connected to each other.

6. A body structure as claimed in claim 4, wherein said plate means comprises a single plate member having its opposite ends rigidly secured to said respective ones of said side walls, said plate member having an upright flange rigidly secured to said inner panel.

7. A body structure as claimed in claim 5, wherein each of said side walls has a laterally outwardly extending flange at a position opposite to said major upright wall, said flanges of said respective ones of said side walls being rigidly secured to said inner panel.

8. A body structure as claimed in claim 7, wherein said bracket portion has a peripheral flange extending outwardly therefrom at right angles to said bracket portion, said peripheral flange of said bracket portion being rigidly secured to said side walls and said major upright wall.

9. A body structure as claimed in claim 8, wherein said brace portion has its opposite side edges formed integrally with respective flanges, said flanges of said brace portion being rigidly secured to said respective ones of said side walls.

10. A body structure as claimed in claim 6, wherein each of said side walls has a laterally outwardly extending flange at a position opposite to said major upright wall, said flanges of said respective ones of said side walls being rigidly secured to said inner panel.

11. A body structure as claimed in claim 10, wherein said bracket portion has a peripheral flange extending outwardly therefrom at right angles to said bracket portion, said peripheral flange of said bracket portion being rigidly secured to said side walls and said major upright wall.

12. A body structure as claimed in claim 11, wherein said brace portion has its opposite side edges formed integrally with respective flanges, said flanges of said brace portion being rigidly secured to said respective ones of said side walls.

* * * * *